L. WEIL.
Cotton Bale-Ties.

No. 146,037. Patented Dec. 30, 1873.

WITNESSES:
A. Bennemendorf.
C. Sedgwick

INVENTOR:
L. Weil
BY Kunnt Co
ATTORNEYS.

AM. PHOTO-LITHOGRAPHIC Co. N.Y. (OSBORNE'S PROCESS)

UNITED STATES PATENT OFFICE.

LEOPOLD WEIL, OF NEW YORK, N. Y.

IMPROVEMENT IN COTTON-BALE TIES.

Specification forming part of Letters Patent No. 146,037, dated December 30, 1873; application filed November 8, 1873.

*To all whom it may concern:*

Be it known that I, LEOPOLD WEIL, of the city, county, and State of New York, have invented a new and Improved Bale and Hoop Tie, of which the following is a specification:

My invention consists of one or more transverse slots through the end portions of the bale or hoop, through one or more of which, in each end portion, a flat metal pin or key is passed, the two end portions being overlapped; and in the case of a bale the key will merely extend along the hoop or band, between the latter and the bale, so as to be secured by the pressure of the bale.

Figure 2:
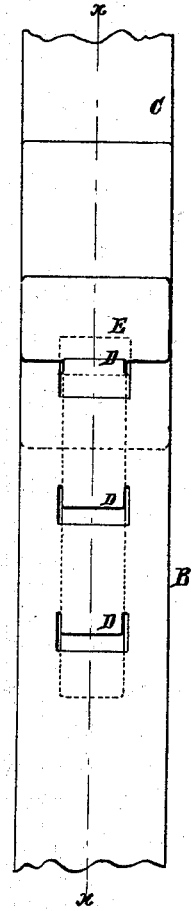
Figure 1:
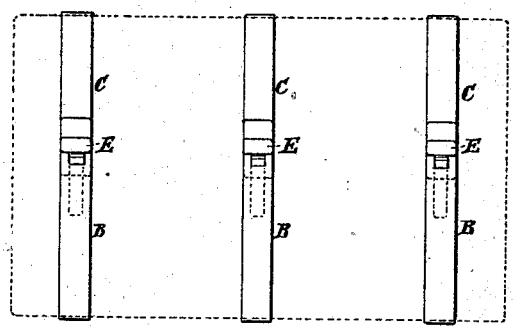
Figure 3:
Figure 4:
Figure 5:
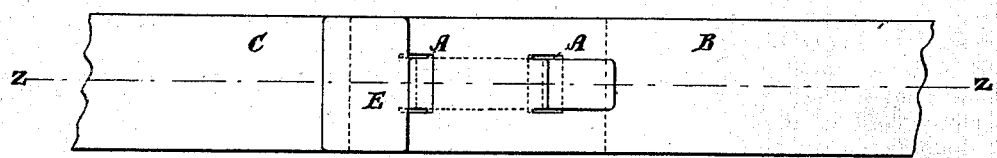
Figure 6:
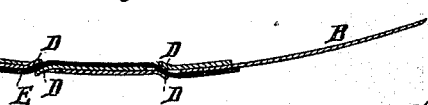

Figure 1 is a front elevation of a bale with bands secured by my improved tie. Fig. 2 is an enlarged side elevation of a band and tie. Fig. 3 is a section of Fig. 2 on the line $x\,x$. Fig. 4 is a side elevation of a barrel-hoop. Fig. 5 is an elevation of a portion of Fig. 4 enlarged, and Fig. 6 is a section of Fig. 5 on the line $z\,z$.

A represents the slots for the pin, which are formed at suitable intervals in each end portion B C, or one in one portion only, so that one or more slots in each portion can be brought together when the band has been strained sufficiently. E is the key or pin, which locks or ties the band together by passing from the front side through the two portions B C, and extends along between the band and the bale far enough to bind it fast. It may, if preferred or found necessary, be passed through other holes to the front again, as in Figs. 5 and 6. By preference, a lip, D, is formed on the band at the end of the slot, which bears against the key, and the lip and said key are bent a little to correspond with the course of the key in passing through the band, to afford larger surfaces at the points subject to the strain for greater permanence and durability.

The key has a head to prevent it from passing through, and, if needed, it may be bent or indented with a punch, together with the part of the band in front or above it, to secure it from working out; but it is not considered necessary.

It will be seen that this tie is very simple and cheap, and is calculated to be secure and permanent.

Having thus described my invention, I claim as new and desire to secure by Letters Patent—

The ends B C of the bale-band, having a series of rectangular slots, A, with their lips D, in combination with the key E, substantially as shown and described.

LEOPOLD WEIL.

Witnesses:
A. P. THAYER,
T. B. MOSHER.